(12) United States Patent
Xiao et al.

(10) Patent No.: US 8,891,461 B2
(45) Date of Patent: Nov. 18, 2014

(54) SYSTEM AND METHOD FOR CONTROL INFORMATION MULTIPLEXING FOR UPLINK MULTIPLE INPUT, MULTIPLE OUTPUT

(75) Inventors: Weimin Xiao, Hoffman Estates, IL (US); Xianghua Wang, Schaumburg, IL (US); Yufei Blankenship, Kildeer, IL (US)

(73) Assignee: FutureWei Technologies, Inc., Plano, TX (US)

( * ) Notice: Subject to any disclaimer, the term of this patent is extended or adjusted under 35 U.S.C. 154(b) by 134 days.

(21) Appl. No.: 13/104,649

(22) Filed: May 10, 2011

(65) Prior Publication Data

US 2011/0310780 A1   Dec. 22, 2011

Related U.S. Application Data

(60) Provisional application No. 61/356,993, filed on Jun. 21, 2010.

(51) Int. Cl.
| | |
|---|---|
| *H04W 4/00* | (2009.01) |
| *H04L 1/00* | (2006.01) |
| *H04L 1/16* | (2006.01) |
| *H04L 27/34* | (2006.01) |
| *H04L 25/03* | (2006.01) |
| *H04L 1/18* | (2006.01) |

(52) U.S. Cl.
CPC ........ *H04L 25/03343* (2013.01); *H04L 1/0028* (2013.01); *H04L 2025/03426* (2013.01); *H04L 1/1671* (2013.01); *H04L 1/1864* (2013.01); *H04L 1/0031* (2013.01); *H04L 1/1861* (2013.01); *H04L 1/0009* (2013.01); *H04L 1/0003* (2013.01); *H04L 27/3488* (2013.01); *H04L 1/0026* (2013.01)
USPC ........................................................ 370/329

(58) Field of Classification Search
None
See application file for complete search history.

(56) References Cited

U.S. PATENT DOCUMENTS

| | | | | |
|---|---|---|---|---|
| 2010/0111018 | A1* | 5/2010 | Chang | 370/329 |
| 2010/0195575 | A1* | 8/2010 | Papasakellariou et al. | 370/328 |
| 2011/0170625 | A1 | 7/2011 | Blankenship et al. | |

(Continued)

FOREIGN PATENT DOCUMENTS

| | | |
|---|---|---|
| CN | 101227233 A | 7/2008 |
| CN | 101615933 A | 12/2009 |

(Continued)

OTHER PUBLICATIONS

"3$^{rd}$ Generation Partnership Project; Technical Specification Group Radio Access Network; Evolved Universal Terrestrial Radio Access (E-UTRA); Physical Channels and Modulation (Release 9)," 3GPP TS 36.211, V9.1.0, Mar. 2010, 85 pages.

(Continued)

*Primary Examiner* — Otis L Thompson, Jr.
(74) *Attorney, Agent, or Firm* — Slater & Matsil, L.L.P.

(57) ABSTRACT

A system and method for control information multiplexing for uplink multiple input, multiple output are provided. A method for transmitting control information over L MIMO layers, where L is an integer value greater than one, includes generating a plurality of control modulation symbols from the control information, filling the L layers by mapping the plurality of control modulation symbols to L layers, and transmitting the L layers.

26 Claims, 13 Drawing Sheets

(56) References Cited

U.S. PATENT DOCUMENTS

| | | | |
|---|---|---|---|
| 2011/0243066 A1* | 10/2011 | Nayeb Nazar et al. | 370/328 |
| 2011/0268080 A1* | 11/2011 | Luo et al. | 370/330 |
| 2011/0274075 A1* | 11/2011 | Lee et al. | 370/329 |
| 2011/0280222 A1* | 11/2011 | Nam et al. | 370/335 |
| 2011/0305286 A1* | 12/2011 | Shimezawa et al. | 375/260 |
| 2012/0051245 A1* | 3/2012 | Nam et al. | 370/252 |

FOREIGN PATENT DOCUMENTS

| | | |
|---|---|---|
| CN | 101924606 A | 12/2010 |
| WO | WO 2010/087641 A2 | 8/2010 |
| WO | WO 2011/082589 A1 | 7/2011 |

OTHER PUBLICATIONS

"3$^{rd}$ Generation Partnership Project; Technical Specification Group Radio Access Network; Evolved Universal Terrestrial Radio Access (E-UTRA); Multiplexing and channel coding (Release 9)," 3GPP TS 36.212, V9.1.0, Mar. 2010, 61 pages.

"3$^{rd}$ Generation Partnership Project; Technical Specification Group Radio Access Network; Evolved Universal Terrestrial Radio Access (E-UTRA); Physical layer procedures (Release 9)," 3GPP TS 36.213, V9.1.0, Mar. 2010, 79 pages.

"3$^{rd}$ Generation Partnership Project; Technical Specification Group Radio Access Network; Evolved Universal Terrestrial Radio Access (E-UTRA); Further advancements for E-UTRA physical layer aspects (Release 9)," 3GPP TR 36.814, V9.0.0, Mar. 2010, 104 pages.

International Search Report of Patent Cooperation Treaty (PCT), International Application No. PCT/CN2011/075397, date of mailing Sep. 22, 2011, Applicant Huawei Technologies Co., Ltd., 3 pages.

"Written Opinion of the International Searching Authority," International Application No. PCT/CN2011/075397, Applicant: Huawei Technologies Co., Ltd., et al., mailing date: Sep. 22, 2011, 5 pages.

"Extended European Search Report," Application No. 11797576.3-1851, Applicant: Huawei Technologies Co., Ltd., Apr. 23, 2013, 9 pages.

Huawei, "Multiplexing scheme with UCI and data on PUSCH transmission," 3GPP TSG RAN WG1 meeting #59bis, R1-100261, Agenda Item 7.3.3, Jan. 18-22, 2010, 6 pages.

LG Electronics, "Multiplexing scheme with UCI and data on PUSCH," 3GPP TSG RAN WG1 #60bis, R1-102387, Agenda Item 6.4.4, Apr. 12-16, 2010, 3 pages.

* cited by examiner

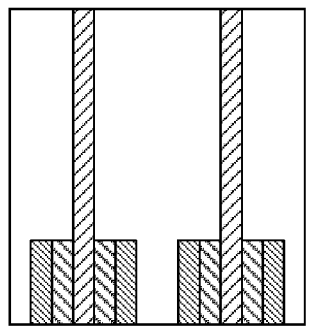
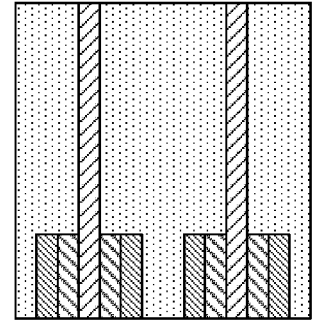
*Fig. 4a*
*Fig. 4b*
- ▨ REFERENCE SIGNAL
- ☐ CQI/PMI OF CW1
- ▦ CQI/PMI OF CW2
- ▧ ACK/NACK
- ▨ RI
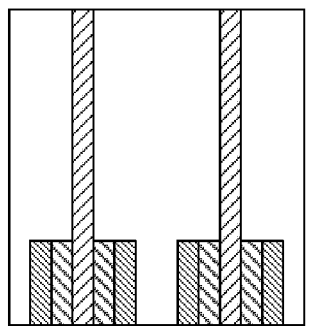
*Fig. 5a*
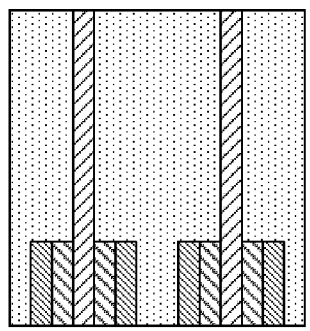
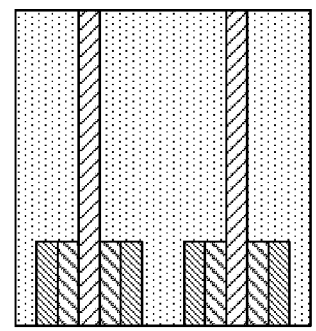
*Fig. 5b*
*Fig. 5c*
- ▨ REFERENCE SIGNAL
- ☐ CQI/PMI OF CW1
- ▦ CQI/PMI OF CW2
- ▧ ACK/NACK
- ▨ RI

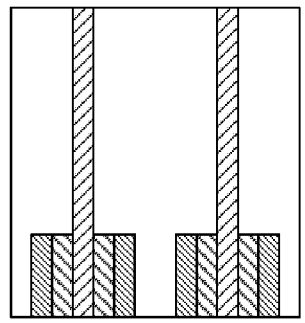
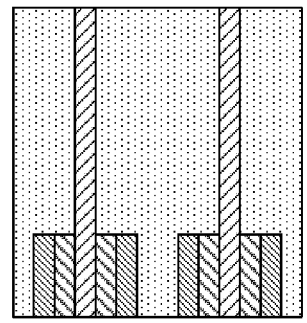
*Fig. 11a*  *Fig. 11b*
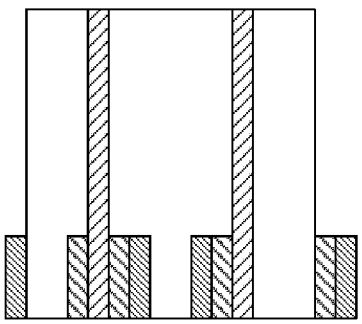
*Fig. 12a*
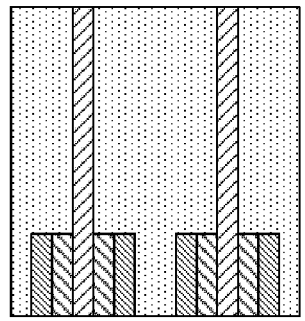
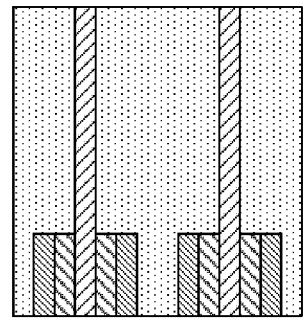
*Fig. 12b*  *Fig. 12c*

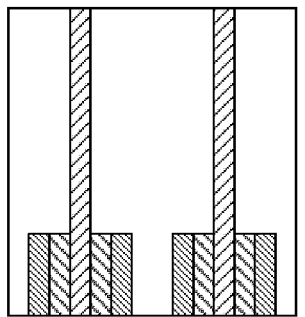# 
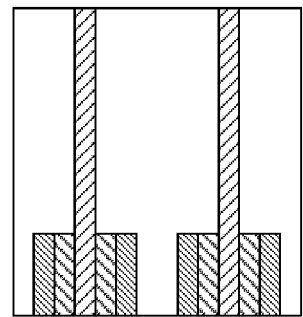
- ▨ REFERENCE SIGNAL
- ☐ CQI/PMI OF CW1
- ▦ DATA OF CW2
- ▩ ACK/NACK
- ▨ RI
*Fig. 13a*
*Fig. 13b*
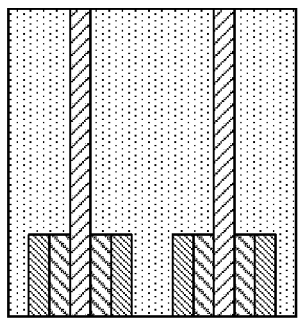
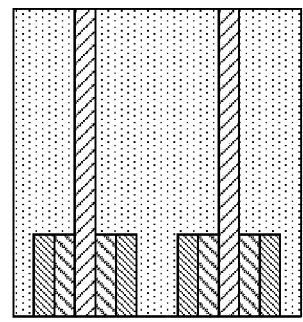
*Fig. 13c*
*Fig. 13d*

SYSTEM AND METHOD FOR CONTROL INFORMATION MULTIPLEXING FOR UPLINK MULTIPLE INPUT, MULTIPLE OUTPUT

This application claims the benefit of U.S. Provisional Application No. 61/356,993, filed on Jun. 21, 2010, entitled "System and Method for Control Information Multiplexing for Uplink Multiple Input, Multiple Output," which application is hereby incorporated herein by reference.

TECHNICAL FIELD

The present invention relates generally to a system and method for wireless communications, and more particularly to a system and method for control information multiplexing for uplink (UL) multiple input, multiple output (MIMO).

BACKGROUND

In the Third Generation Partnership Project (3GPP) Long Term Evolution (LTE) Release 8 technical specifications, uplink control information (UCI) may be transmitted on a physical uplink shared channel (PUSCH) when a) UCI are sent simultaneously with uplink shared channel (UL-SCH) data or b) aperiodic control information, such as channel quality information (CQI), precoding matrix indication (PMI), rank indicator (RI), and so forth, reporting is triggered with or without UL-SCH data.

When user equipment (UE) has a valid uplink scheduling grant, network resources are assigned for the UL-SCH in a corresponding subframe. In the subframe, the uplink layer 1 (L1)/layer 2 (L2) control signaling may be multiplexed with the coded UL-SCH onto a physical uplink shared channel (PUSCH) prior to modulation and discrete Fourier transform (DFT) transform precoding. The control signaling may include hybrid automatic repeat request (HARQ) acknowledgements and channel status reports.

SUMMARY OF THE INVENTION

These and other problems are generally solved or circumvented, and technical advantages are generally achieved, by preferred embodiments of the present invention which provides a system and method for control information multiplexing for UL MIMO.

In accordance with another preferred embodiment of the present invention, a method for transmitting control information over L MIMO layers, where L is an integer value greater than one, is provided. The method includes generating a plurality of control modulation symbols from the control information, filling the L layers by mapping the plurality of control modulation symbols to L layers, and transmitting the L layers.

In accordance with another preferred embodiment of the present invention, a communications device is provided. The communications device includes a symbol generate unit, a layer fill unit coupled to the symbol generate unit, and a transmitter coupled to the layer fill unit. The symbol generate unit generates a plurality of control modulation symbols from control information, the layer fill unit fills L layers by mapping the plurality of control modulation symbols to the L layers, where L is an integer value greater than one, and the transmitter transmits the L layers.

In accordance with another preferred embodiment of the present invention, a method for transmitting control information and data information over ($L_1+L_2$) MIMO layers, where $L_1>=1$, $L_2>=1$, is provided. The method includes generating a plurality of control modulation symbols from the control information, filling a first set of layers by mapping the plurality of control modulation symbols to the first set of layers, where the first set of layers includes $L_1$ layers, generating a plurality of data modulation symbols from the data information, mapping the data modulation symbols to a second set of layers the $L_2$ layers, where the second set of layers includes $L_2$ layers and the second set of layers do not overlap with the first set of layers, and transmitting the data modulation symbols and the control modulation symbols on the first and second set of layers simultaneously.

In accordance with another preferred embodiment of the present invention, a communications device is provided. The communications device includes a symbol generate unit, a layer fill unit coupled to the symbol generate unit, and a transmitter coupled to the layer fill unit. The symbol generate unit generates a plurality of control modulation symbols from control information and a plurality of data modulation symbols from data information, and the layer fill unit fills a first set of layers by mapping the plurality of control modulation symbols to the first set of layers and fills a second set of layers by mapping the data modulation symbols to the second set of layers. The first set of layers includes $L_1$ layers and the second set of layers includes $L_2$ layers, where $L_1$ and $L_2$ are integer values and $L_1>=1$, $L_2>=1$, and the first set of layers does not overlap with the second set of layers. The transmitter simultaneously transmits the first set of layers and the second set of layers.

One advantage disclosed herein is that transmitting the same control information over multiple MIMO layers allow for the exploitation of transmit diversity to improve overall performance.

A further advantage of exemplary embodiments is that by extending the mapping of a CW to multiple MIMO layers allows for multi-layer channel capacity to be efficiently utilized.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 4a and 4b are example diagrams of a mapping of two CWs to two layers according to example embodiments described herein;

FIGS. 5a through 5c are example diagrams of a mapping of two CWs to three layers according to example embodiments described herein;

FIGS. 11a and 11b are example diagrams of a mapping of two CWs to two layers according to example embodiments described herein;

FIGS. 12a through 12c are example diagrams of a mapping of two CWs to three layers according to example embodiments described herein;

FIGS. 13a through 13d are example diagrams of a mapping of two CWs to four layers according to example embodiments described herein;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a Third Generation Partnership Project (3GPP) Long Term Evolution Advanced (LTE-Advanced) compliant communications system. The invention may also be applied, however, to other communications systems, such as those that are adherent to WiMAX, IEEE 802.16, and so forth, technical standards, as well as those that support control information multiplexing on multiple MIMO layers.

For 3GPP Release-8/9 (aka, LTE), uplink control information (UCI) can be sent on PUSCH when (a) UCI are sent with UL-SCH data simultaneously or (b) aperiodic CQI/PMI/RI reporting is triggered without uplink UL-SCH data. For situation a), wherein UCI are sent simultaneously with UL-SCH data, when a user equipment (UE), otherwise referred to as a mobile station, terminal, user, and so forth, has a valid UL scheduling grant, network resources are assigned for the UL-SCH in a corresponding subframe. In the subframe, UCI may be multiplexed with the coded UL-SCH onto the PUSCH prior to modulation and discrete Fourier Transform (DFT) precoding. Control signaling may include channel state information (CQI, PMI, RI and so forth), hybrid automatic repeat requested (HARQ) acknowledgements (HARQ-ACK or otherwise noted as ACK/NACK).

Figure 1A:
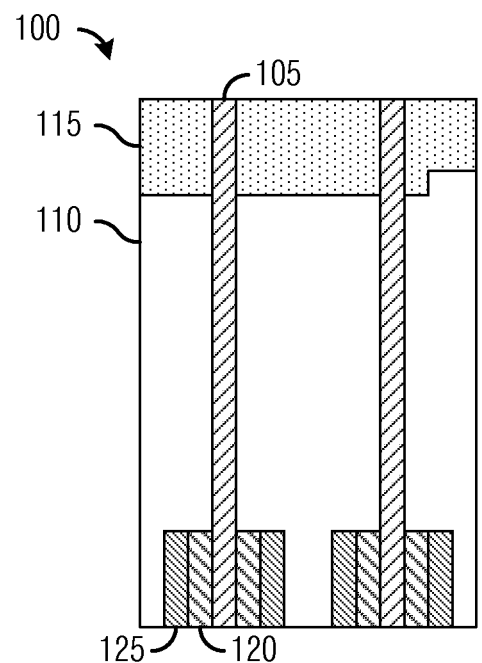
FIG. 1a is an example space diagram of UL control information and data in LTE (Release 8)

FIG. 1a illustrates a space diagram 100 of UL control information and data in LTE (Release 8). Since in LTE (Release 8) there is only one UL layer, control information and UL-SCH data are multiplexed. Space diagram 100 may be partitioned into different zones with the zones carrying different information. Zones hashed with a similar hashing pattern carry similar information. For example, zone 105 may be used to carry a reference signal, e.g., a pilot. While zone 110 may be used to carry UL-SCH data, zone 115 may be used to carry CQI and/or PMI information, zone 120 may be used to carry ACKs/NACKs used in HARQ, and zone 125 may be used to carry RI information.

For situation b), wherein aperiodic control information reporting is triggered without UL-SCH data, a UE may perform aperiodic control information (such as CQI, PMI, RI, and so forth) reporting via the PUSCH upon receiving a valid UL scheduling grant for UCI without UL-SCH transmission. For example, if $I_{MCS}=29$, CQI Request Bit in downlink control information (DCI) format zero is set to one, and $N_{PRB} \leq 4$, then there is no transport block for UL-SCH data and only control information feedback for PUSCH reporting mode is transmitted by the UE (see 3GPP TS 36.213 V9.1.0 (2010-03) "Physical Layer Procedures (Release 9)").

Figure 1B:
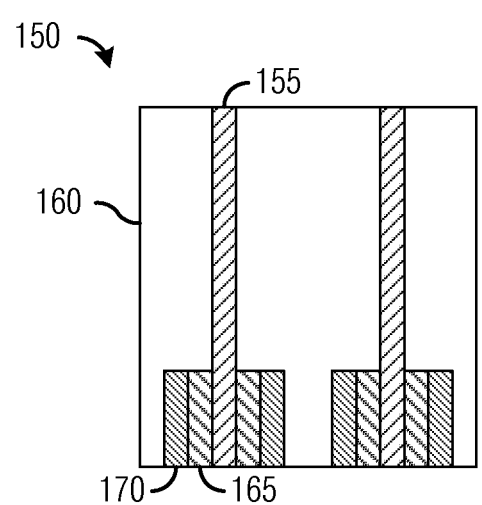
FIG. 1b is an example space diagram of UL control information in LTE (Release 8)

FIG. 1b illustrates a space diagram 150 of UL control information in LTE (Release 8/9). Since in LTE (Release 8/9) there is only one UL layer, control information may be multiplexed on PUSCH. Space diagram 150 may be partitioned into different zones with the zones carrying different information. Zones hashed with a similar hashing pattern carry similar information. For example, zone 155 may be used to carry a reference signal, e.g., a pilot. While zone 160 may be used to carry CQI and/or PMI information, zone 165 may be used to carry ACKs/NACKs used in HARQ, and zone 170 may be used to carry RI information.

Each zone may contain a plurality of resource elements (REs) with an exact number of resource elements assigned to an individual zone being dependent on factors such as coding and modulation scheme being used, communications system configuration, number of UE operating, and so forth. The proportions of the various zones shown in space diagrams 100 and 150 are not intended to illustrate precise relationships of the amount of resource elements allocated to the various zones, but to convey a relative relationship and arrangement of the zones.

For 3GPP Rel-10 (commonly referred to as LTE-Advanced (LTE-A)), a transmission block (TB) may be mapped to a MIMO codeword (CW) after a chain of processing including channel coding, rate matching, modulation, and so on, the same as in LTE. However, the maximum number of MIMO layers in LTE-A uplink is increased to four and the maximum number of MIMO codewords is increased to two.

Figure 2:
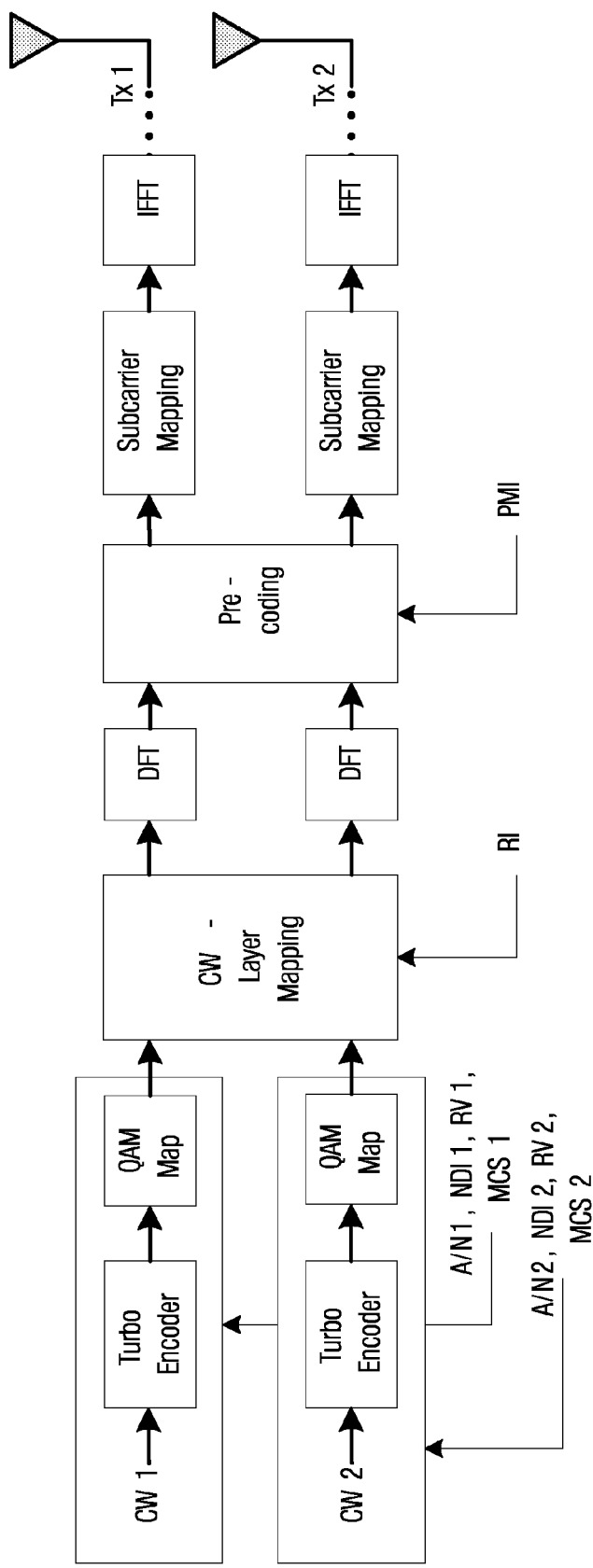
FIG. 2 is an example diagram of a transmitter structure of rank-2 UL transmission using two TBs for two transmit antennas in the case of no HARQ-ACK spatial bundling without layer shifting according to example embodiments described herein.

When two MIMO codewords (corresponding to two transport blocks) are transmitted on the uplink, two modulation and coding scheme (MCS) indicators and two new data indicators (NDI) will be indicated with DCI for a two CW UL scheduling grant. FIG. 2 illustrates a transmitter structure 200 of rank-2 UL transmission using two TBs for two transmit antennas in the case of no HARQ-ACK spatial bundling without layer shifting.

Figure 3A:
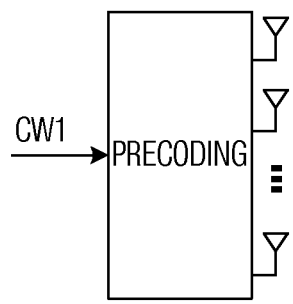
FIG. 3a is an example diagram of a single codeword to a single layer mapping in LTE according to example embodiments described herein.
Figure 3B:
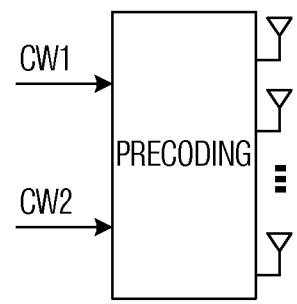
FIG. 3b is an example diagram of a mapping of two codewords to two layers according to example embodiments described herein.
Figure 3C:
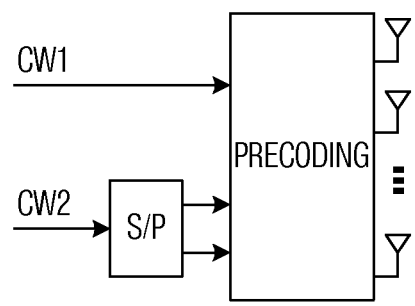
FIG. 3c is an example diagram of a mapping of two codewords to three layers according to example embodiments described herein.
Figure 3D:
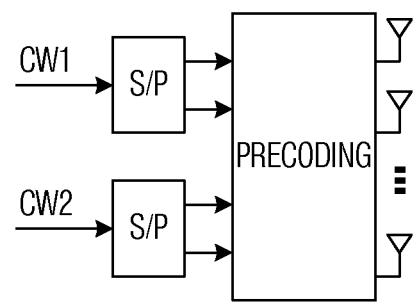
FIG. 3d is an example diagram of a mapping of two codewords to four layers according to example embodiments described herein.
Figure 3E:
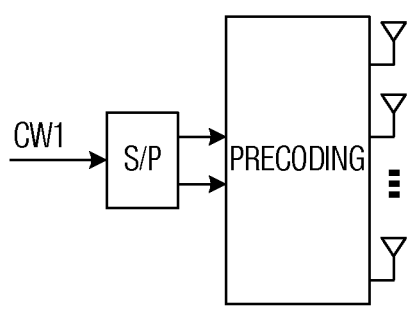
FIG. 3e is an example diagram of a mapping of one codeword to two layers according to example embodiments described herein.

FIGS. 3a through 3e illustrate combinations of CW to layer mapping for LTE-A. FIG. 3a illustrates a single codeword to a single layer mapping in LTE. FIG. 3b illustrates a mapping of two codewords to two layers. FIG. 3c illustrates a mapping of two codewords to three layers. FIG. 3d illustrates a mapping of two codewords to four layers. FIG. 3e illustrates a mapping of one codeword to two layers. If the design as used in DL LTE is used, then the mapping shown in FIG. 3e may only be used for retransmissions where an initial transmission used two layers to send the TB.

In the following, situation a) of LTE-A, UCI multiplexing on PUSCH without data, is discussed. UCI multiplexing on PUSCH without data occurs when UCI (e.g., CQI/PMI and/or other control/feedback information) is sent on PUSCH without UL-SCH data, for example, as a result of triggering signaling as in the case of aperiodic feedback, and HARQ-ACK and/or RI may be sent in PUSCH at the same time.

For one layer transmission, the same UCI multiplexing scheme as used in 3GPP LTE Release 8 may be used, as shown in FIG. 1b. New designs for UCI multiplexing may be needed for scenarios with multiple MIMO layers. To extend UCI mapping to multiple layers, several options are possible:

Option 1) Divide UCI to two CWs, with CQI/PMI and HARQ-ACK/RI multiplexing on both CWs; and Option 2) Maintain one CW for UCI, but extend one CW mapping to all layers.

Option 1) may utilize UL-MIMO multi-layer transmission with current codeword-to-layer mapping techniques. But the CQI/PMI information may have to be segmented to two TB and coded to two CWs. In the case of aperiodic CQI reporting on PUSCH without UL-SCH data, since the modulation and TB size are specified by default and not indicated in DCI, it may be most likely to apply the same MCS for both CWs and determine TB size in terms of each layer bearing equal amount of CQI/PMI information. As a result, the two CWs will most likely have different error rates. The overall CQI/PMI performance will depend on the worse of the two CWs considering the particularity of CQI/PMI. Combined with considerations on CRC overhead, it may be better to perform CRC attachment, channel coding and rate matching prior to segmenting the CQI/PMI information into two TBs. i.e., a new transport channel processing needs to be defined in LTE-A standard for aperiodic CQI. Furthermore, different types of UCI information may be transmitted on different CWs. For example, CQI may be sent on one CW while PMI may be sent on another CW.

With option 2), the potential multi-layer channel capacity may be efficiently utilized. Compared to option 1), it may not be necessary to define new transport channel processing. But codeword-to-layer mapping may need to be extended with one CW mapping to more than two layers if utilizing more than two layers channel capacity is seen desirable. Limiting the CW mapping to up to two layers with option 2) may be needed.

Specifically, when using option 1) to multiplex UCI on two CWs without UL-SCH data (i.e., two CWs for aperiodic CQI without UL-SCH data), the CQI/PMI may be transmitted across all layers of both CWs. HARQ-ACK and RI may be replicated to all layers and mapped to the same REs across all layers. To indicate two CWs for aperiodic CQI without UL-SCH data, the DCI format for a UL grant with two CWs may be set as: "CQI request"=on (for example, value of 1), $N_{PRB} \leq n$ (where n is a predefined relative small integer), and MCS levels to a predefined value, for example $I_{MCS_1} = I_{MCS_2} = 29$ FIGS. 4a and 4b illustrate a mapping of two CWs to two layers. As shown in FIG. 4a, a first CW is mapped to a first layer, and in FIG. 4b, a second CW is mapped to a second layer. HARQ-ACK and RI symbols mapped to the second layer are the same as HARQ-ACK and RI symbols mapped to the first layer. An advantage of replicating HARQ-ACK and RI symbols may be a maximizing of spatial diversity for HARQ-ACK and RI information.

FIGS. 5a through 5c illustrate a mapping of two CWs to three layers. As shown in FIG. 5a, a first CW is mapped to a first layer, and in FIGS. 5b and 5c, a second CW is mapped to both a second layer and a third layer. Although shown in FIGS. 5a through 5c as the first CW being mapped to a single layer and the second CW being mapped to two layers, other combinations may be possible. However, HARQ-ACK and RI symbols on each of the three layers are the same and occupy the same RE.

Figure 6A:
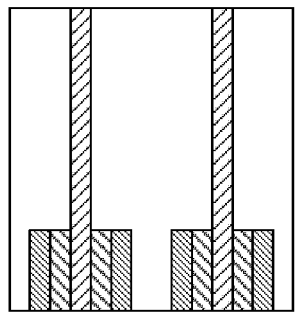
FIGS. 6a through 6d are example diagrams of a mapping of two CWs to four layers according to example embodiments described herein.
Figure 6B:
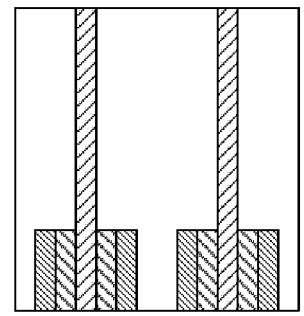
Figure 6C:
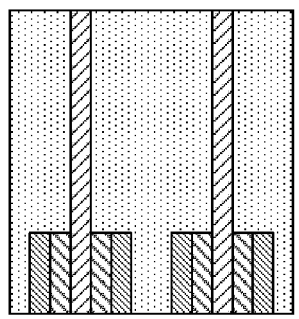
Figure 6D:
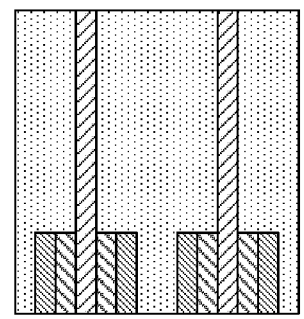

FIGS. 6a through 6d illustrate a mapping of two CWs to four layers. As shown in FIGS. 6a and 6b, a first CW is mapped to both a first layer and a second layer, and in FIGS. 6c and 6d, a second CW is mapped to both a third layer and a fourth layer. Although shown in FIGS. 6a through 6d as the first CW being mapped to the first two layers and the second CW being mapped to the second two layers, other combinations may be possible. However, HARQ-ACK and RI symbols on each of the four layers are the same and occupy the same RE.

When using option 2) to multiplex UCI, maintaining one CW for UCI as in 3GPP LTE Release 8 but extending one CW mapping to all layers may be used. HARQ-ACK and RI may be mapped to all available layers. HARQ-ACK and RI may then be able to take advantage of maximizing spatial diversity with less impact on downlink signaling.

Figure 7A:
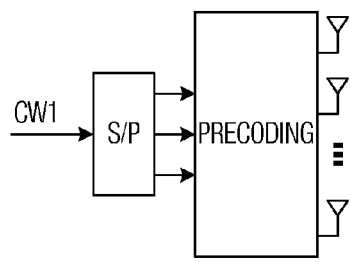
FIGS. 7a through 7c are example diagrams of new CW to layer mappings according to example embodiments described herein.
Figure 7B:
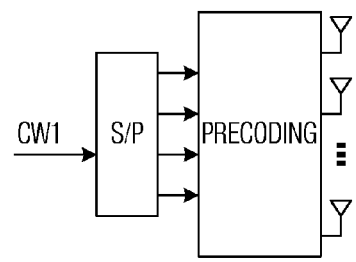
Figure 7C:
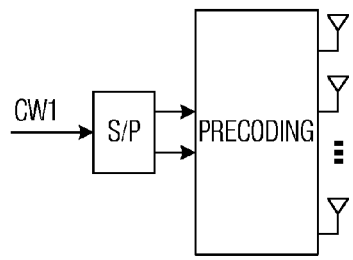

FIGS. 7a through 7c illustrate new CW to layer mappings. FIG. 7a illustrates a mapping of one CW to three layers and FIG. 7b illustrates a mapping of one CW to four layers. FIG. 7c illustrates the same mapping of one CW to two layers as shown in FIG. 3e.

Figure 8A:
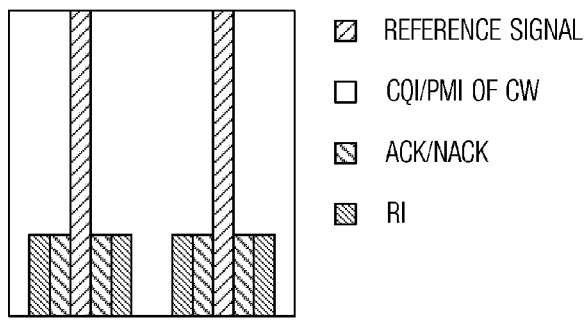
FIGS. 8a and 8b are example diagrams of a mapping of a CW to two layers according to example embodiments described herein.
Figure 8B:
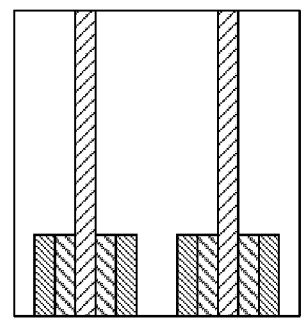

FIGS. 8a and 8b illustrate a mapping of a CW to two layers. As shown in FIGS. 8a and 8b, the CW is mapped to both a first layer and a second layer. HARQ-ACK and RI symbols mapped to the second layer are the same as HARQ-ACK and RI symbols mapped to the first layer. An advantage of replicating HARQ-ACK and RI symbols may be a maximizing of spatial diversity for HARQ-ACK and RI information.

Figure 9A:
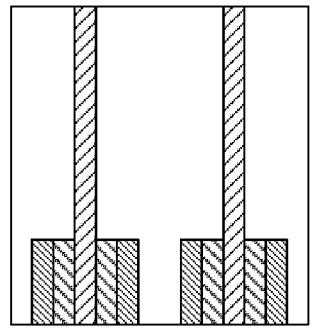
FIGS. 9a through 9c are example diagrams of a mapping of a CW to three layers according to example embodiments described herein.
Figure 9B:
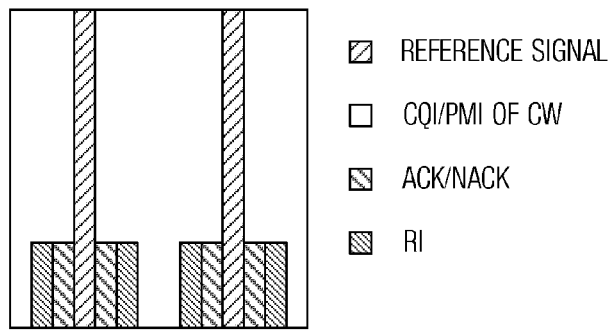
Figure 9C:
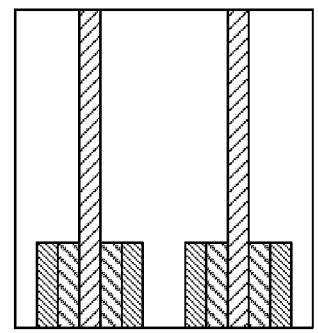
Figure 10A:
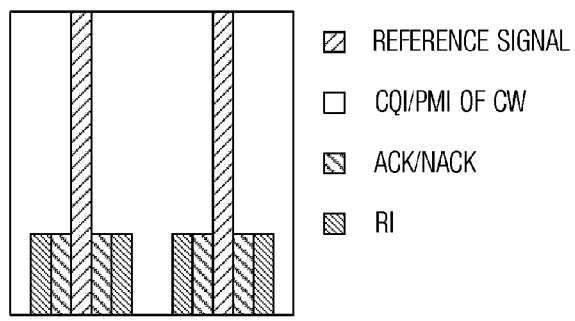
FIGS. 10a through 10d are example diagrams of a mapping of a CW to four layers according to example embodiments described herein.
Figure 10B:
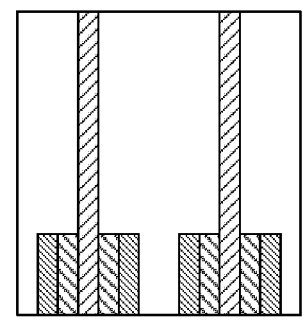
Figure 10C:
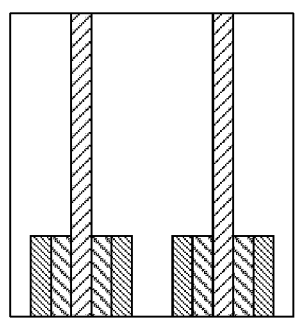
Figure 10D:
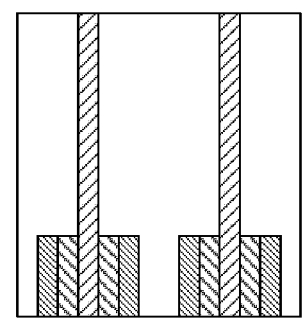

FIGS. 9a through 9c illustrate a mapping of a CW to three layers. As shown in FIGS. 9a through 9c, the CW is mapped to a first layer, a second layer, and a third layer. HARQ-ACK and RI symbols on each of the three layers are the same and occupy the same RE.

FIGS. 10a through 10d illustrate a mapping of a CW to four layers. As shown in FIGS. 10a through 10d, the CW is mapped to a first layer, a second layer, a third layer, and a fourth layer. HARQ-ACK and RI symbols on each of the four layers are the same and occupy the same RE.

In the following, situation b) of LTE-A, multiplexing of UCI and UL-SCH data, is discussed. In multiplexing of UCI and UL-SCH data in LTE-A, a concern may be with a scenario where assigned PUSCH resources are relatively small. When the PUSCH resources are relatively small, it may be better to assign different CWs for aperiodic CQI/PMI (or other UCI) and UL-SCH data, i.e., aperiodic CQI and UL-SCH are spatial division multiplexed onto different transmission layers.

Advantages include:

1. It may be easy to satisfy different performance requirement of CQI/PMI and UL-SCH data. When the assigned resource is relative small, if CQI/PMI and UL-SCH data multiplexed to the same CW, most of the resource for UL-SCH data will be reduced to place CQI/PMI information, which may result in unsuccessful UL-SCH data transmission of the CW. Meanwhile, since the MCS is selected to meet UL-SCH frame error rate (FER) requirements, although there are offset factors $\beta_{offset}^{HARQ-ACK}$, $\beta_{offset}^{RI}$ and $\beta_{offset}^{CQI}$, it is not an optimized MCS scheme for UCI.

2. It may be simpler for receiver processing. Since the CQI/PMI and UL-SCH data are transmitted in different CWs, the decoding and retransmission processing of UL-SCH data is much simpler and the use of an advanced receiver may be possible.

3. It may be simpler for receiver implementation if the CQI/PMI is mapped to layers belonging to one CW.

A criteria/rule may be needed to select the appropriate CW for CQI/PMI. The CW may be selected explicitly (for example, a first CW may be selected) via higher layer signaling or dynamic PDCCH signaling. Alternatively, the CW may be selected implicitly by using the CW with higher signal plus interference to noise ratio (SINR) or the CW occupying the larger number (or smaller number) of layers, or a combination thereof.

Since the resources assigned for the UL-SCH may be various, it is not appropriate to select the CW simply by using the SINR or number of layers. The selection of the CW should be based on a match between channel capacity of the layers to which the CW will be mapped and the payload of current CQI/PMI. It is a combined consideration of the resources allocated, SINR/MCS and layer numbers of the CW, error probability requirement and payload of CQI/PMI. The selection principle applies to cases where two codewords mapped to two, three, or four MIMO layers, such as shown in FIGS. 3b through 3d. Therefore, it is better to let an enhanced NodeB (eNB) select the appropriate CW.

In order to indicate which CW is being used for aperiodic CQI/PMI, the two MCS fields in DCI for a two CW UL grant may be used. A possible approach to indicate which CW is being used for CQI/PMI reported is shown below.

If "CQI request" bit is set to 1, $N_{PRB} \leq n$ (where n is a predefined relative small integer), and $I_{MCS}=29$ (or some other predefined value), then there is no UL-SCH transmitting but only the control information feedback on the corresponding CW of which $I_{MCS}=29$.

Considering that the payload of CQI/PMI may be relatively small, the restriction of $N_{PRB} \leq n$ may be reasonable. As for HARQ-ACK and RI, they should be replicated across all layers of both CWs and occupy the same REs across the layers.

FIGS. 11a and 11b illustrate a mapping of two CWs to two layers, where the first CW is composed of UCI (CQI/PMI, to be specific) only, and the second CW is composed of UL_SCH data only. As shown in FIG. 11a, a first CW is mapped to a first layer, and in FIG. 11b, a second CW is mapped to a second layer. HARQ-ACK and RI symbols mapped to the second layer are the same as HARQ-ACK and RI symbols mapped to the first layer. An advantage of replicating HARQ-ACK and RI symbols may be a maximizing of spatial diversity for HARQ-ACK and RI information.

FIGS. 12a through 12c illustrate a mapping of two CWs to three layers, where the first CW is composed of UCI (CQI/PMI, to be specific) only, and the second CW is composed of UL_SCH data only. As shown in FIG. 12a, a first CW is mapped to a first layer, and in FIGS. 12b and 12c, a second CW is mapped to both a second layer and a third layer. Although shown in FIGS. 12a through 12c as the first CW being mapped to a single layer and the second CW being mapped to two layers, other combinations may be possible. However, HARQ-ACK and RI symbols on each of the three layers are the same and occupy the same RE.

FIGS. 13a through 13d illustrate a mapping of two CWs to four layers, where the first CW is composed of UCI (CQI/PMI, to be specific) only, and the second CW is composed of UL_SCH data only. As shown in FIGS. 13a and 13b, a first CW is mapped to both a first layer and a second layer, and in FIGS. 13c and 13d, a second CW is mapped to both a third layer and a fourth layer. Although shown in FIGS. 13a through 13d as the first CW being mapped to the first two layers and the second CW being mapped to the second two layers, other combinations may be possible. However, HARQ-ACK and RI symbols on each of the four layers are the same and occupy the same RE.

In the following, the DCI design is discussed. Table 1 shows a DCI design for UCI multiplexing on PUSCH. In Table 1, parameter n is a predefined integer value.

TABLE 1

| DCI design of aperiodic CQI multiplexing on PUSCH | |
|---|---|
| 2 CWs of CQI, without DL-SCH data | DCI for 2 CW UL grant, "CQI request" = On (e.g., value 1), $I_{MCS_1} = I_{MCS_2} = 29$ (or other predefined value), $N_{PRB} \leq n$ |
| 1 CW of CQI, extend 1 CW to multi-layer mapping | DCI for 2 CW UL grant with one CW disabled, "CQI request" = On (e.g., value 1), $I_{MCS\_enabled} = 29$ (or another predefined value), $N_{PRB} \leq n$; or, DCI for 1CW UL grant with PMI/RI indication, "CQI request" = On (e.g., value 1), $I_{MCS} = 29$ (or another predefined value), $N_{PRB} \leq n$ |
| 2 CWs of data, CQI multiplexing to single CW | DCI for 2 CW UL grant, "CQI request" = On (e.g., value 1), $I_{MCS} \neq 29$ or $N_{PRB} > n$ |

TABLE 1-continued

DCI design of aperiodic CQI multiplexing on PUSCH

| | |
|---|---|
| 1 CW of CQI, 1 CW of data | DCI for 2 CW UL grant, "CQI request" = On (e.g., value 1), $N_{PRB} \leq n$, the CW of which $I_{MCS} = 29$ (or another predefined value) is the CW for CQI |

In the following, formulas to determine the number of UCI symbols are discussed. In 3GPP LTE, for UCI multiplexing on PUSCH without UL-SCH data, a formula for determining the number of coded symbols Q' for HARQ-ACK or rank indicator is expressible as $$Q' = \min\left(\left\lceil \frac{O \cdot M_{sc}^{PUSCH} \cdot N_{symb}^{PUSCH} \cdot \beta_{offset}^{PUSCH}}{O_{CQI-MN}} \right\rceil, 4 \cdot M_{sc}^{PUSCH}\right),$$

where O is the number of HARQ-ACK bits or rank indicator bits, $O_{CQI-MIN}$ is the number of CQI bits including CRC bits assuming rank equals to 1.

For HARQ-ACK information $$Q_{ACK} = Q_m \cdot Q' \text{ and } [\beta_{offset}^{PUSCH} = \beta_{offset}^{HARQ-ACK} / \beta_{offset}^{CQI}],$$

for rank indication $$Q_{RI} = Q_m \cdot Q' \text{ and } [\beta_{offset}^{PUSCH} = \beta_{offset}^{RI} / \beta_{offset}^{CQI}],$$

and for CQI and/or PMI information $$Q_{CQI} = N_{symb}^{PUSCH} \cdot M_{sc}^{PUSCH} \cdot Q_m - Q_{RI}.$$

In 3GPP LTE-A, to extend to multi-layer PUSCH transmission, the above formulas need to be updated. The number of coded symbols Q' for HARQ-ACK or rank indicator on each layer should be the same as it in LTE. For CQI and/or PMI information $$Q_{CQI} = (N_{symb}^{PUSCH} \cdot M_{sc}^{PUSCH} \cdot Q_m - Q_{RI}) \cdot N_{layer},$$

where $Q_{RI}$ is the coded bits of RI on each layer, and $N_{layer}$ is the number of layers for UCI multiplexing.

In 3GPP LTE, for UCI and UL-SCH data multiplexing on PUSCH, it shall determine the number of coded symbols Q' for HARQ-ACK or rank indicator as $$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right),$$

where O is the number of HARQ-ACK bits or rank indicator bits, for HARQ-ACK $$Q_{ACK} = Q_m \cdot Q' \text{ and } [\beta_{offset}^{PUSCH} = \beta_{offset}^{HARQ-ACK}],$$

for rank indication $$Q_{RI} = Q_m \cdot Q' \text{ and } [\beta_{offset}^{PUSCH} = \beta_{offset}^{RI}].$$

The number of coded symbols Q' for channel quality information may be determined as $$Q' = \min\left(\left\lceil \frac{(O+L) \cdot M_{sc}^{PUSCH-initial} \cdot N_{symb}^{PUSCH-initial} \cdot \beta_{offset}^{PUSCH}}{\sum_{r=0}^{C-1} K_r} \right\rceil,\right.$$

$$\left. M_{sc}^{PUSCH} \cdot N_{symb}^{PUSCH} - \frac{Q_{RI}}{Q_m}\right),$$

where O is the number of CQI/PMI bits, L is the number of CRC bits, $Q_{CQI} = Q_m \cdot Q'$ and $[\beta_{offset}^{PUSCH} = \beta_{offset}^{CQI}]$.

In 3GPP LTE-A, for CQI/PMI and UL-SCH data using different CWs, the above formulas need to be updated. To determine the number of coded symbols Q' for HARQ-ACK or RI on each layer, the formula can be the same as it in 3GPP LTE (i.e., determined by the CW of data), determined by the CW of CQI/PMI, or determined by a combination thereof.

Determining by the CW of CQI/PMI, it shall determine the number of coded symbols Q' for HARQ-ACK or rank indicator on each layer as $$Q' = \min\left(\left\lceil \frac{O \cdot M_{sc}^{PUSCH} \cdot N_{symb}^{PUSCH} \cdot \beta_{offset}^{PUSCH}}{O_{CQI-MIN}} \right\rceil, 4 \cdot M_{sc}^{PUSCH}\right).$$

The coded bits of HARQ-ACK on each layer are $$Q_{ACK} = Q_m \cdot Q' \text{ and } [\beta_{offset}^{PUSCH} = \beta_{offset}^{HARQ-ACK} / \beta_{offset}^{CQI}],$$

and the coded bits of RI on each layer are $$Q_{RI} = Q_m \cdot Q' \text{ and } [\beta_{offset}^{PUSCH} = \beta_{offset}^{RI} / \beta_{offset}^{CQI}].$$

Determining by the combination of the CW of CQI/PMI and the CW of data, the number of coded symbols Q' for HARQ-ACK or rank indicator on each layer may be determined as $$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r + O_{CQI-MIN} \cdot \beta_{offset}^{CQI}} \right\rceil, 4 \cdot M_{sc}^{PUSCH}\right).$$

The coded bits of HARQ-ACK on each layer are $$Q_{ACK} = Q_m \cdot Q' \text{ and } [\beta_{offset}^{PUSCH} = \beta_{offset}^{HARQ-ACK}],$$

and the coded bits of RI on each layer are $$Q_{RI} = Q_m \cdot Q' \text{ and } [\beta_{offset}^{PUSCH} = \beta_{offset}^{RI}].$$

For CQI/PMI, no matter how is the number of coded symbols for HARQ-ACK or RI is determined, the coded bits of CQI/PMI are expressible as $$Q_{CQI} = (N_{symb}^{PUSCH} \cdot M_{sc}^{PUSCH} \cdot Q_m - Q_{RI}) \cdot N_{layer\_CQI},$$

where $Q_{RI}$ are the coded bits of RI on each layer, and $N_{layer\_CQI}$ is the number of layers for CQI multiplexing.

Figure 14:
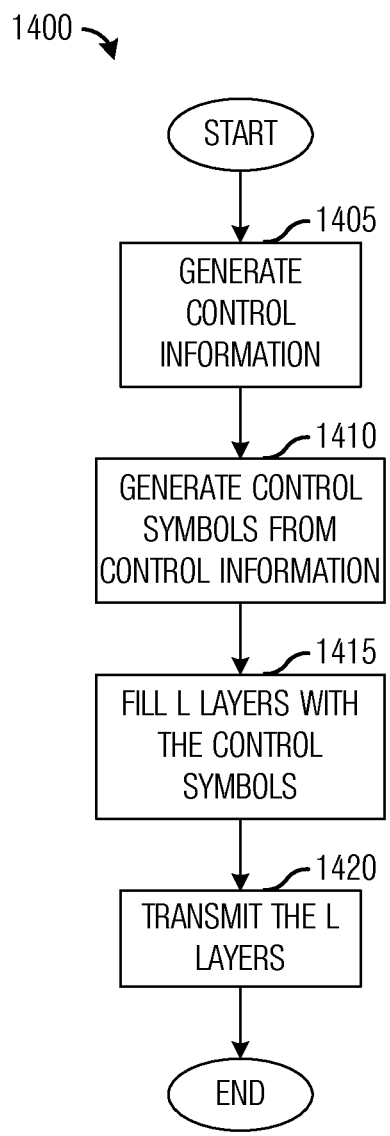
FIG. 14 illustrates an example flow diagram of operations in the transmission of control information over multiple MIMO layers according to example embodiments described herein.

FIG. 14 illustrates a flow diagram of operations 1400 in the transmission of control information over multiple MIMO layers. Operations 1400 may be indicative of operations occurring in a UE as the UE transmits a CW of control information, such as CQI, over multiple MIMO layers, without UL-SCH data. Operations 1400 may occur while the UE is in a normal operating mode.

Although the discussion focuses on UL transmissions (from a UE to a communications controller), operations 1400 may also be applicable to DL transmissions (from a communications controller to a UE). Therefore, the discussion presented herein should not be construed as being limiting to either the scope or the spirit of the example embodiments.

Operations 1400 may begin with the UE generating control information to be transmitted, e.g., feedback, to the communications controller (block 1405). As an example, the control information may include HARQ ACK/NACK, CQI, PMI, RI, and so forth.

The UE may generate a plurality of control symbols, e.g., control modulation symbols, from the control information (block 1410). The control information may be partitioned into multiple control units, which may then be encoded, e.g., using turbo encoding techniques, and then modulated, e.g., a QAM mapping unit.

The UE may fill a plurality of MIMO layers, such as two or more MIMO layers, with the control symbols (block 1415). According to an example embodiment, the control symbols may be distributed through the plurality of MIMO layers so that each MIMO layer has about equal numbers of the control symbols. As an example, the control symbols may be distributed in a round-robin fashion over the plurality of MIMO layers. Alternatively, the control symbols may be used to fill each MIMO layer in the plurality of MIMO layers in sequential fashion. Alternatively, the control symbols may be used to fill the plurality of MIMO layers in a random fashion.

The UE may transmit the plurality of MIMO layers (block 1420).

Figure 15:
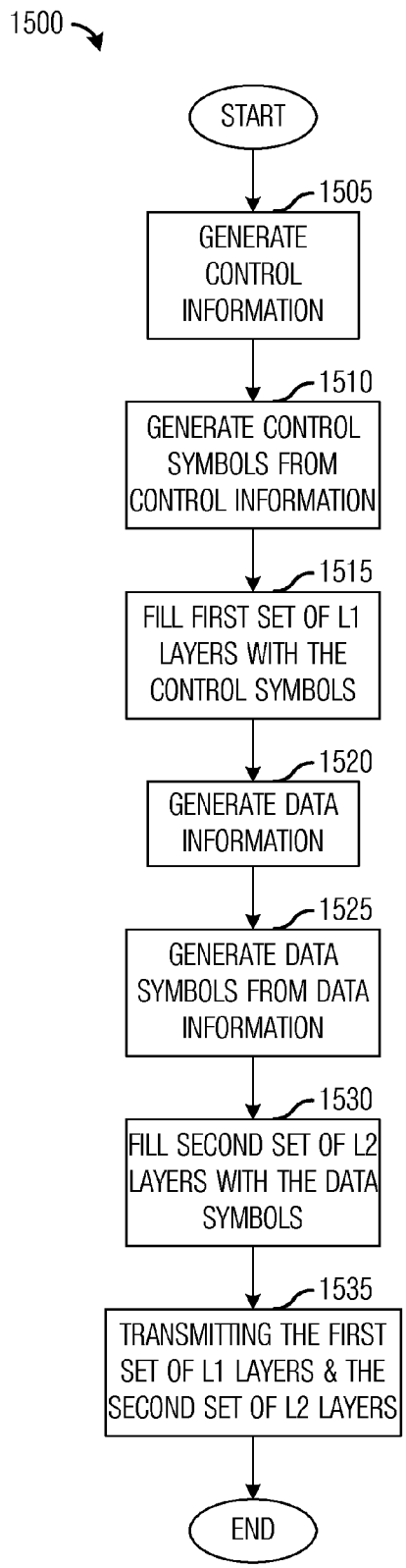
FIG. 15 illustrates an example flow diagram of operations in the transmission of control information over multiple MIMO layers according to example embodiments described herein.

FIG. 15 illustrates a flow diagram of operations 1500 in the transmission of control information over multiple MIMO layers. Operations 1500 may be indicative of operations occurring in a UE as the UE transmits a CW of control information, such as CQI, over multiple MIMO layers, with UL-SCH data. Operations 1500 may occur while the UE is in a normal operating mode.

Although the discussion focuses on UL transmissions (from a UE to a communications controller), operations 1500 may also be applicable to DL transmissions (from a communications controller to a UE). Therefore, the discussion presented herein should not be construed as being limiting to either the scope or the spirit of the example embodiments.

Operations 1500 may begin with the UE generating control information to be transmitted, e.g., feedback, to the communications controller (block 1505). As an example, the control information may include HARQ ACK/NACK, CQI, PMI, RI, and so forth.

The UE may generate a plurality of control symbols, e.g., control modulation symbols, from the control information (block 1510). The control information may be partitioned into multiple control units, which may then be encoded, e.g., using turbo encoding techniques, and then modulated, e.g., a QAM mapping unit.

The UE may fill at least one first MIMO layers, such as one or more first MIMO layers, with the control symbols (block 1515). According to an example embodiment, the control symbols may be distributed through the at least one first MIMO layers so that each MIMO layer has about equal numbers of the control symbols. As an example, the control symbols may be distributed in a round-robin fashion over the at least one first MIMO layers. Alternatively, the control symbols may be used to fill each MIMO layer in the at least one first MIMO layers in sequential fashion. Alternatively, the control symbols may be used to fill the at least one first MIMO layers in a random fashion.

The UE may generate data information to be transmitted (block 1520). The UE may generate data symbols from the data information (block 1525). The data information may be partitioned into multiple data units, which may then be encoded, e.g., using turbo encoding techniques, and then modulated, e.g., a QAM mapping unit.

The UE may fill at least one second MIMO layers, such as one or more second MIMO layers, with the data symbols (block 1530). According to an example embodiment, the data symbols may be distributed through the at least one second MIMO layers so that each MIMO layer has about equal numbers of the data symbols. As an example, the data symbols may be distributed in a round-robin fashion over the at least one second MIMO layers. Alternatively, the data symbols may be used to fill each MIMO layer in the at least one second MIMO layers in sequential fashion. Alternatively, the data symbols may be used to fill the at least one second MIMO layers in a random fashion.

The at least one first MIMO layers and the at least one second MIMO layers may be disjoint, meaning that the data symbols transmit on different MIMO layers from the MIMO layers filled by the control symbols.

The UE may transmit the at least one first MIMO layers and the at least one second MIMO layers (block 1535).

Figure 16:
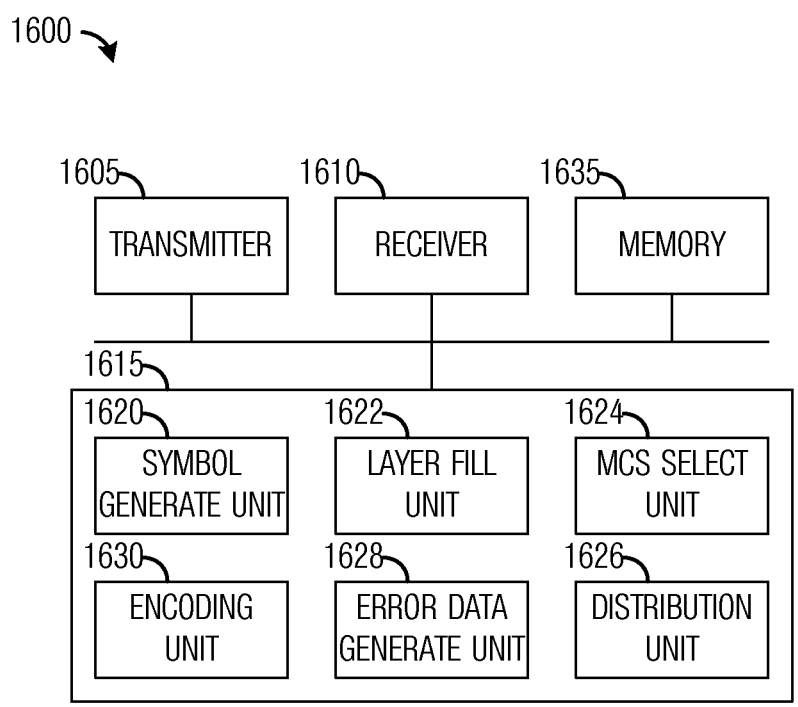
FIG. 16 provides an example communications device according to example embodiments described herein.

FIG. 16 provides an alternate illustration of a communications device 1600. Communications device 1600 may be an implementation of a UE. Communications device 1600 may be used to implement various ones of the embodiments discussed herein. As shown in FIG. 16, a transmitter 1605 is configured to transmit information and a receiver 1610 that is configured to receive information and indications.

A symbol generate unit 1620 is configured to generate symbols, such as modulated symbols, from information, such as control information and/or data information. Symbol generate unit 1620 is configured to partition the information into multiple units, which may then be encoded and/or modulated. A layer fill unit 1622 is configured to fill and/or map one or more layers, such as MIMO layers, with the generated symbols. Layer fill unit 1622 may use a variety of techniques to fill the one or more layers, including round-robin, random, layer first, or so on. A MCS select unit 1624 is configured to select a modulation and coding scheme for symbols in a later.

A distribution unit 1626 is configured to distribute information, such as data information and/or control information, into one or more CWs. An error data generate unit 1628 is configured to generate error protection data for the one or more CWs. An encoding unit 1630 is configured to encode the one or more CWs with the error protection data. A memory 1635 is configured to store the information, the CW, the symbols, MCS, and so forth.

The elements of communications device 1600 may be implemented as specific hardware logic blocks. In an alternative, the elements of communications device 1600 may be implemented as software executing in a processor, controller, application specific integrated circuit, or so on. In yet another alternative, the elements of communications device 1600 may be implemented as a combination of software and/or hardware.

As an example, receiver 1610 and transmitter 1605 may be implemented as a specific hardware block, while symbol generate unit 1620, layer fill unit 1622, MCS select unit 1624, distribution unit 1626, error data generate unit 1628, and encoding unit 1630 may be software modules executing in a microprocessor (such as processor 1615) or a custom circuit or a custom compiled logic array of a field programmable logic array.

The above described embodiments of communications device 1600 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 14 and 15—is used to indicate the desired specific use (or non-use) of such terms.

Advantageous features of embodiments of the invention may include: a method for transmitting control information, the method comprising: distributing a first control information onto N codewords, wherein N is a integer value greater than one; generating N pluralities of first control symbols from the N codewords; for each of N sets of layers, filling the set of layers by mapping one of the N pluralities of first control symbols to the set of layers, wherein the set of layers is composed of one or more layers; generating a plurality of second control symbols from a second control information; filling a subset of layers in the N sets of layers with the plurality of second control symbols; and transmitting the N sets of layers.

The method could further include, wherein filling a subset of layers in the N sets of layers comprises fill all layers in the N sets of layers with the plurality of second control symbols. The method could further include, wherein a location of the plurality of second control symbols in a first layer is identical to a location of the plurality of second control symbols in all remaining layers in the N sets of layers.

The method could further include, wherein N is equal to two, and wherein distributing a first control information onto N codewords comprises: distributing a first portion of the first control information onto a first codeword; and distributing a second portion of the first control information onto a second codeword. The method could further include, wherein for each of N sets of layers, filling the set of layers by mapping one of the N pluralities of first control symbols comprises: filling each layer of a first set of layers with a first plurality of first control symbols; and filling each layer of a second set of layers with a second plurality of first control symbols.

The method could further include, wherein filling a subset of layers in the N sets of layers with the plurality of second control symbols comprises filling each layer in the subset of layers in the N sets of layers with the plurality of second control symbols. The method could further include, wherein the transmitting occurs in an uplink, and wherein a location of the pluralities of first control symbols is indicated by a downlink control indicator.

The method could further include, wherein the downlink control indicator comprises a modulation and coding scheme indicator. The method could further include, wherein a separate modulation and coding scheme indicator is used to indicate a location of the pluralities of first control symbols for each of the N codewords.

The method could further include, wherein a size of resources of an uplink channel used in the transmitting is small. The method could further include, further comprising: attaching correcting code data to the distributed first information and the distributed second information; and encoding distributed first information and the distributed second information together with the correcting code data.

Advantageous features of embodiments of the invention may include: a method for transmitting control information, the method comprising: distributing a first control information onto N codewords, wherein N is a positive integer value; generating N pluralities of first control symbols from the N codewords; for each of N sets of layers, filling the set of layers by mapping one of the N pluralities of first control symbols to the set of layers, wherein the set of layers is composed of one or more layers; generating a plurality of second control symbols from a second control information; filling a subset of layers in the N sets of layers with the plurality of second control symbols; generating a plurality of third symbols from a third information; mapping the plurality of third symbols to a (N+1)-st set of layers, wherein the (N+1)-st set of layers does not overlap with any layer in the N sets of layers; and transmitting the N+1 sets of layers.

The method could further include, wherein filling a subset of layers further comprises filling a subset of layers of the (N+1)-st set of layers with the plurality of second control symbols. The method could further include, wherein filling a subset of layers comprises filling all layers of the N+1 sets of layers with the plurality of second control symbols.

The method could further include, wherein the third information comprises uplink data. The method could further include, wherein N is equal to one, and wherein distributing a first control information onto N codewords comprises distributing an entirety of the first control information onto a single codeword.

The method could further include, wherein distributing each of the N codewords comprises distributing the single codeword onto each layer of the one of N sets of layers.

Advantageous features of embodiments of the invention may include: a method for transmitting control information over L MIMO layers, where L is an integer value greater than one, the method comprising: generating a plurality of control modulation symbols from the control information; filling the L layers by mapping the plurality of control modulation symbols to L layers; and transmitting the L layers.

The method could further include, wherein the control information comprises uplink control information. The method could further include, wherein the control information comprises a first control information and a second control information.

The method could further include, wherein the first control information comprises channel quality information, precoding matrix indicator, or a combination thereof. The method could further include, wherein generating a plurality of control modulation symbols from the first control information comprises: attaching CRC bits to the first control information to form a first bit sequence; encoding the first bit sequence C1A to produce a second bit sequence; and producing a sequence of control modulation symbols from the second bit sequence.

The method could further include, wherein the control information is transmitted aperiodically. The method could further include, wherein the control information is transmitted in response to a trigger.

Advantageous features of embodiments of the invention may include: a method for transmitting control information and data information over (L1+L2) MIMO layers, where L1>=1, L2>=1, the method comprising: generating a plurality of control modulation symbols from the control information; filling a first set of layers by mapping the plurality of control modulation symbols to the first set of layers, wherein the first set of layers is composed of L1 layers; generating a plurality of data modulation symbols from the data information; mapping the data modulation symbols to a second set of layers the L2 layers, where the second set of layers is composed of L2 layers and the second set of layers do not overlap with the first set of layers; and transmitting the data modulation symbols and the control modulation symbols on the first and second set of layers simultaneously.

The method could further include, wherein the first set of layers is indicated by a first field in an earlier transmission. The method could further include, wherein the second set of layers is indicated by a second field in an earlier transmission.

The method could further include, wherein the control information comprises a first control information and a second control information. The method could further include, wherein the first control information comprises channel quality information, precoding matrix indicator, or a combination thereof.

The method could further include, wherein the second control information comprises the ACK/NACK information for HARQ response. The method could further include, wherein a number of control modulation symbols generated from the second control information is determined by a modulation and coding scheme (MCS) level of the first control information, the MCS level of the data information, or a combination thereof.

The method could further include, wherein the second control information comprises rank indication (RI) information. The method could further include, wherein a number of control modulation symbols generated from the second control information is determined by a modulation and coding scheme (MCS) level of the first control information, the MCS level of the data information, or a combination thereof.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmitting control information over L multiple input, multiple output (MIMO) layers, where L is an integer value greater than one, the method comprising:
   generating a plurality of control modulation symbols from the control information;
   filling the L layers by mapping the plurality of control modulation symbols to the L layers, wherein the L layers do not contain data information; and
   transmitting the L layers.

2. The method of claim 1, wherein the control information comprises uplink control information.

3. The method of claim 2, wherein the control information comprises a first group of control information and a second group of control information.

4. The method of claim 3, wherein a number of control modulation symbols generated from the second group of control information is determined by a modulation and coding scheme (MCS) level of the first group of control information.

5. The method of claim 3, wherein the first group of control information comprises channel quality information, a precoding matrix indicator, or a combination thereof.

6. The method of claim 5, wherein generating a plurality of control modulation symbols from the first group of control information comprises:
   attaching cyclic redundancy check (CRC) bits to the first group of control information to form a first bit sequence;
   encoding the first bit sequence to produce a second bit sequence; and
   producing a sequence of control modulation symbols from the second bit sequence.

7. The method of claim 5, wherein a codeword or codewords where the plurality of control modulation symbols is mapped to is provided by downlink control information.

8. The method of claim 7, wherein the downlink control information comprises a modulation and coding scheme information and a request for the first group of control information.

9. The method of claim 2, wherein the control information is transmitted aperiodically.

10. The method of claim 9, wherein the control information is transmitted in response to a trigger.

11. A communications device comprising:
   a symbol generate unit configured to generate a plurality of control modulation symbols from control information;
   a layer fill unit coupled to the symbol generate unit, the layer fill unit configured to fill L multiple input, multiple output (MIMO) layers by mapping the plurality of control modulation symbols to the L layers, where L is an integer value greater than one, and wherein the L layers do not contain data information; and
   a transmitter coupled to the layer fill unit, the transmitter configured to transmit the L layers.

12. The communications device of claim 11, wherein the control information comprises a first group of control information and a second group of control information.

13. The communications device of claim 12, wherein the first group of control information comprises channel quality information, a precoding matrix indicator, or a combination thereof.

14. The communications device of claim 13, wherein the symbol generate unit generates the plurality of control modulation symbols by attaching cyclic redundancy check (CRC) bits to the first group of control information to form a first bit sequence, encoding the first bit sequence to produce a second bit sequence, and producing a sequence of control modulation symbols from the second bit sequence.

15. The communications device of claim 13, wherein a codeword or codewords where the plurality of control modulation symbols is mapped to is provided by downlink control information.

16. The communications device of claim 15, wherein the downlink control information comprises a modulation and coding scheme information and a request for the first group of control information.

17. The communications device of claim 12, wherein a number of control modulation symbols generated from the second group of control information is determined by a modulation and coding scheme (MCS) level of the first group of control information.

18. A method for transmitting control information and data information over $(L_1+L_2)$ multiple input, multiple output (MIMO) layers, where $L_1>=1$, $L_2>=1$, the method comprising:
- generating a plurality of control modulation symbols from the control information, wherein the control information is channel quality information and/or precoding matrix indicator;
- filling a first set of layers by mapping the plurality of control modulation symbols to the first set of layers, wherein the first set of layers comprises the $L_1$ layers;
- generating a plurality of data modulation symbols from the data information;
- mapping the data modulation symbols to a second set of layers, where the second set of layers comprises the $L_2$ layers and the second set of layers do not overlap with the first set of layers; and
- transmitting the data modulation symbols and the control modulation symbols on the first set of layers and second set of layers simultaneously.

19. The method of claim 18, wherein the first set of layers and the second set of layers are indicated by a combination of fields in a downlink control information transmission.

20. The method of claim 18, further comprising mapping acknowledgement and/or negative acknowledgement information for hybrid automatic repeat requested response to all of the $L_1+L_2$ MIMO layers.

21. The method of claim 20, wherein a number of modulation symbols generated from the acknowledgement and/or negative acknowledgement information is determined by a modulation and coding scheme (MCS) level of the control information, an MCS level of the data information, or a combination thereof.

22. The method of claim 18, further comprising mapping rank indication (RI) information to all of the $L_1+L_2$ MIMO layers.

23. A communications device comprising:
- a symbol generate unit configured to generate a plurality of control modulation symbols from control information and a plurality of data modulation symbols from data information, wherein the control information is channel quality information and/or precoding matrix indicator;
- a layer fill unit coupled to the symbol generate unit, the layer fill unit configured to fill a first set of multiple input, multiple output (MIMO) layers by mapping the plurality of control modulation symbols to the first set of layers and to fill a second set of MIMO layers by mapping the data modulation symbols to the second set of layers, wherein the first set of layers comprises $L_1$ layers and the second set of layers comprises $L_2$ layers, wherein $L_1$ and $L_2$ are integer values and $L_1>=1$, $L_2>=1$, and wherein the first set of layers does not overlap with the second set of layers; and
- a transmitter coupled to the layer fill unit, the transmitter configured to simultaneously transmit the first set of layers and the second set of layers.

24. The communications device of 23, wherein the layer fill unit is further configured to map acknowledgement and/or negative acknowledgement information for hybrid automatic repeat requested response to all of the $L_1+L_2$ layers.

25. The communications device of claim 24, wherein a number of modulation symbols generated from the acknowledgement and/or negative acknowledgement information is determined by a modulation and coding scheme (MCS) level of the control information, an MCS level of the data information, or a combination thereof.

26. The communications device of claim 23, wherein the layer fill unit is further configured to map rank indication (RI) information to all of the $L_1+L_2$ layers.

* * * * *